US008903715B2

(12) United States Patent
Agarwal

(10) Patent No.: US 8,903,715 B2
(45) Date of Patent: Dec. 2, 2014

(54) HIGH BANDWIDTH PARSING OF DATA ENCODING LANGUAGES

(75) Inventor: Kanak B. Agarwal, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 378 days.

(21) Appl. No.: 13/464,384

(22) Filed: May 4, 2012

(65) Prior Publication Data
US 2013/0297292 A1 Nov. 7, 2013

(51) Int. Cl.
*G06F 17/28* (2006.01)
*G06F 17/20* (2006.01)
*G06F 17/27* (2006.01)
*G06F 17/21* (2006.01)
*G10L 21/00* (2013.01)

(52) U.S. Cl.
USPC ............... 704/9; 704/2; 704/4; 704/7; 704/8; 704/10; 704/270; 704/270.1; 704/275

(58) Field of Classification Search
USPC ............ 704/2, 4, 7, 8, 9, 10, 270, 270.1, 275
See application file for complete search history.

(56) References Cited

U.S. PATENT DOCUMENTS

| | | | |
|---|---|---|---|
| 6,785,677 B1 * | 8/2004 | Fritchman | 1/1 |
| 7,225,188 B1 * | 5/2007 | Gai et al. | 1/1 |
| 7,318,194 B2 | 1/2008 | Achilles et al. | |
| 7,400,271 B2 * | 7/2008 | Cameron | 341/50 |
| 7,509,574 B2 | 3/2009 | Kamiya | |
| 7,562,009 B1 * | 7/2009 | Emerson et al. | 704/9 |
| 7,596,745 B2 | 9/2009 | Dignum et al. | |
| 7,665,015 B2 | 2/2010 | Dignum et al. | |
| 7,665,016 B2 | 2/2010 | Behrens et al. | |
| 7,716,577 B2 | 5/2010 | Behrens et al. | |
| 7,728,738 B2 * | 6/2010 | Cameron | 341/50 |
| 7,734,091 B2 | 6/2010 | Van Lunteren | |
| 8,077,061 B2 * | 12/2011 | Cameron | 341/50 |
| 8,099,438 B2 | 1/2012 | Calahan | |
| 2003/0041302 A1 | 2/2003 | McDonald | |
| 2003/0108043 A1 * | 6/2003 | Liao | 370/392 |

(Continued)

OTHER PUBLICATIONS

Cameron, Robert D. et al., "Parallel Parsing with Bitstream Addition: An XML Case Study", Simon Fraser University, Technical Report No. SFU-CS-2010-11, Oct. 26, 2010, 18 pages.
Dai, Zefu et al., "A 1 Cycle-Per-Byte XML Parsing Accelerator", FPGA, 2010, 10 pages.

(Continued)

*Primary Examiner* — Edgar Guerra-Erazo
(74) *Attorney, Agent, or Firm* — Francis Lammes; Stephen J. Walder, Jr.; William J. Stock

(57) ABSTRACT

A mechanism is provided for accelerating data exchange language parsing. An input data stream is loaded into a first in, first out (FIFO) memory. A tokenization bit corresponding to a next byte to be read is extracted from a FIFO. A determination is made as to whether the tokenization bit corresponding to the next byte to be read from the FIFO indicates a control character or a non-control character located in an associated FIFO memory location in the FIFO. Responsive to the tokenization bit indicating the control character, the control character that causes a state change in a state machine is processed. Responsive to the tokenization bit indicating the non-control character, a length associated with the tokenized bit is identified and a set of non-control characters that do not cause a state change in the state machine are processed based on the length associated with the tokenized bit.

22 Claims, 4 Drawing Sheets

(56) References Cited

U.S. PATENT DOCUMENTS

| | | | |
|---|---|---|---|
| 2006/0047500 A1* | 3/2006 | Humphreys et al. | 704/9 |
| 2006/0050968 A1* | 3/2006 | Oh et al. | 382/219 |
| 2006/0117307 A1* | 6/2006 | Averbuch et al. | 717/143 |
| 2006/0236225 A1 | 10/2006 | Achilles et al. | |
| 2006/0253465 A1 | 11/2006 | Willis et al. | |
| 2006/0271835 A1* | 11/2006 | Marcy et al. | 715/500 |
| 2006/0284745 A1* | 12/2006 | Cameron | 341/50 |
| 2008/0033974 A1* | 2/2008 | Cameron | 707/101 |
| 2008/0040345 A1* | 2/2008 | Cameron | 707/6 |

OTHER PUBLICATIONS

El-Hassan, Fadi et al., "A High-Performance Architecture of an XML Processor for SIP-based Presence", 6th Int'l Conference in ITNG '09, 2009, 6 pages.

El-Hassan, Fadi et al., "SCBXP: An Efficient Hardware-Based XML Parsing Technique", IEEE Fifth Southern Conference on Programmable Logic, 2009, pp. 45-50.

Van Lunteren, Jan et al., "XML Accelerator Engine", First International Workshop on High Performance XML Processing, 2004, 6 pages.

* cited by examiner

US 8,903,715 B2

HIGH BANDWIDTH PARSING OF DATA ENCODING LANGUAGES

BACKGROUND

The present application relates generally to an improved data processing apparatus and method and more specifically to mechanisms for high bandwidth parsing of data encoding languages.

A data exchange language is a language that is domain-independent and can be used for any kind of data. Its semantic expression capabilities and qualities are largely determined by comparison with the capabilities of natural languages. The term is also applied to any file format that can be read by more than one program, including proprietary formats. However, a file format is not a real language as it lacks a grammar and vocabulary.

Practice has shown that certain types of formal languages are better suited for this task than others, since their specification is driven by a formal process instead of a particular software implementation need. For example. Extensible Markup Language (XML) is a markup language that was designed to enable the creation of dialects (the definition of domain-specific sublanguages) and is a popular choice now in particular on the Internet. Other formal languages used for data exchange may include: Atom, JavaScript Object Notation (JSON), YAML, Relative Expression Based Object Language (REBOL), and Gellish. Beneficial to a reliable data exchange is the availability of standard dictionaries-taxonomies and tools libraries such as parsers, schema validators and transformation tools.

SUMMARY

In one illustrative embodiment, a method, in a data processing system, is provided for accelerating data exchange language parsing. The illustrative embodiment loads an input data stream into a first in, first out (FIFO) memory. The illustrative embodiment extracts a tokenization bit corresponding to a next byte to be read from the FIFO. The illustrative embodiment determines whether the tokenization bit corresponding to the next byte to be read from the FIFO indicates a control character or a non-control character located in an associated FIFO memory location in the FIFO. Responsive to the tokenization bit indicating the control character located in the associated FIFO memory location in the FIFO, the illustrative embodiment processes the control character. In the illustrative embodiment, the control character causes a state change in a state machine. In the illustrative embodiment, processing the control character increments the FIFO read pointer by one space. Responsive to the tokenization bit indicating the non-control character located in the associated FIFO memory location in the FIFO, the illustrative embodiment identifies a length associated with the tokenized bit. The illustrative embodiment processes a set of non-control characters based on the length associated with the tokenized bit. In the illustrative embodiment, processing the set of control characters increments the FIFO read pointer based on the length associated with the tokenized bit. In the illustrative embodiment, the set of non-control characters do not cause a state change in the state machine In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Extensible Markup Language (XML) and JavaScript Object Notation (JSON) are widely used for data exchange in network based applications such as web sendees, messaging systems, or the like. These data exchange languages, as well as other known data exchange languages, are flexible, interoperable, self-describing, text-based, and semi-structured data/document formats. Parsing data encoding languages in software, such as document object model (DOM) and Simple API for XML (SAX), can create significant bottlenecks for application processing. Benchmarks have shown significant performance degradation in XML middleware applications as compared to proprietary middleware applications. Several approaches have been proposed for custom hardware offloading and acceleration of data exchange language processing. Hardware acceleration of language parsing can provide significant performance gains in a variety of applications including semi-structured data processing, SOA/web sendees, or the like.

Most hardware based language parsing architectures, such as parsing architectures for Extensible Markup Language (XML), Atom, JavaScript Object Notation (JSON), YAML, Relative Expression Based Object Language (REBOL), Gellish, or the like, employ a set of state machines to process different types of language constructs encountered during reception of the input character stream. Typically, those language parsing architectures process one character every cycle to avoid the possibility of multiple state transitions in a single cycle. Those state machines make state transitions only when one relevant syntax character is received in the input character stream. However, a significant fraction of the encoded document may contain character sequences that do not contain control characters and, hence, do not require any state transition. Processing these character sequences on a character by character basis is sub-optimal as these non-control character sequences may be easily processed as multiple characters every cycle rate without encumbering state machines.

Thus, the illustrative embodiments provide for accelerating data exchange language parsing by tokenizing language syntax characters within the input character stream. The tokenization on control characters presents variable length tokens for subsequent processing. A single character length token is presented for processing whenever a language syntax character is encountered with a single to multiple character length token being presented when the character sequence does not contain any of the language specific syntax characters. While state machine transitions are similar to the state transitions in the conventional architectures with at most one transition every cycle, variable length token processing improves average processing bandwidth with no state machine explosion.

Figure 1:
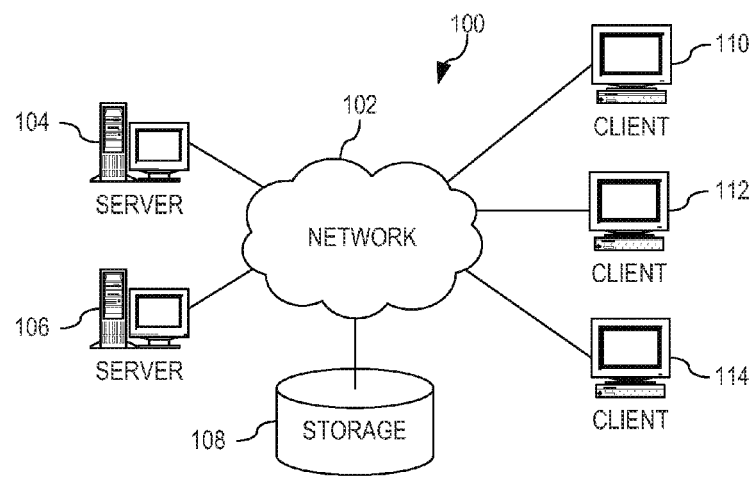
FIG. 1 is an example diagram of a distributed data processing system in which aspects of the illustrative embodiments may be implemented.
Figure 2:
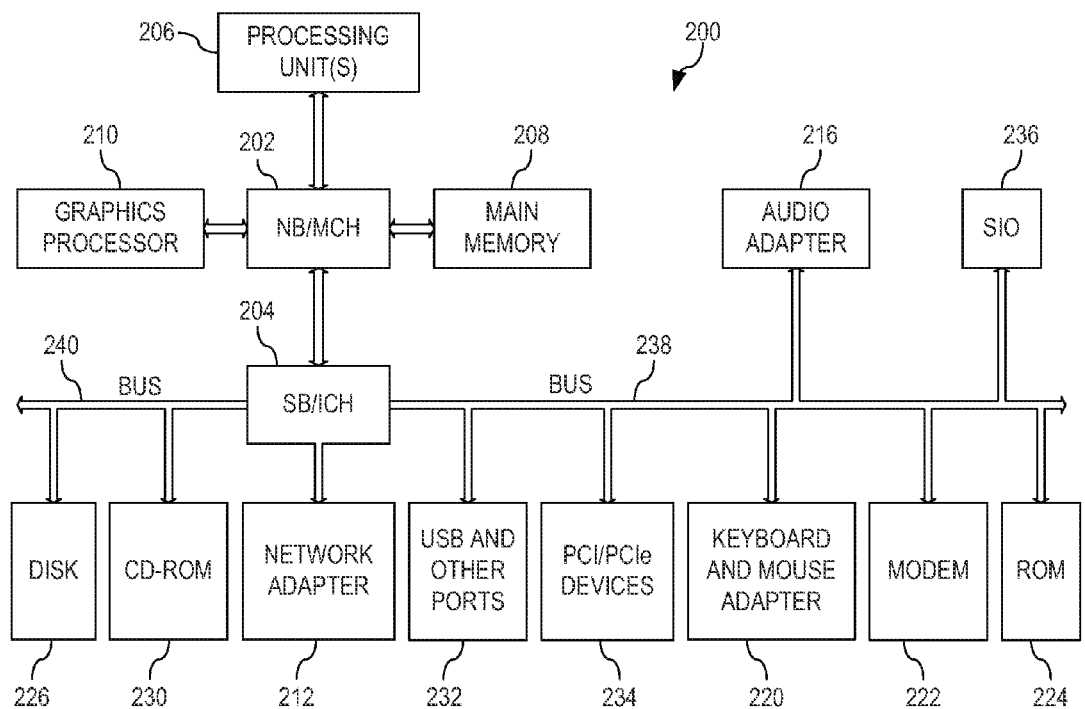
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments. FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as hoot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202, Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers, PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
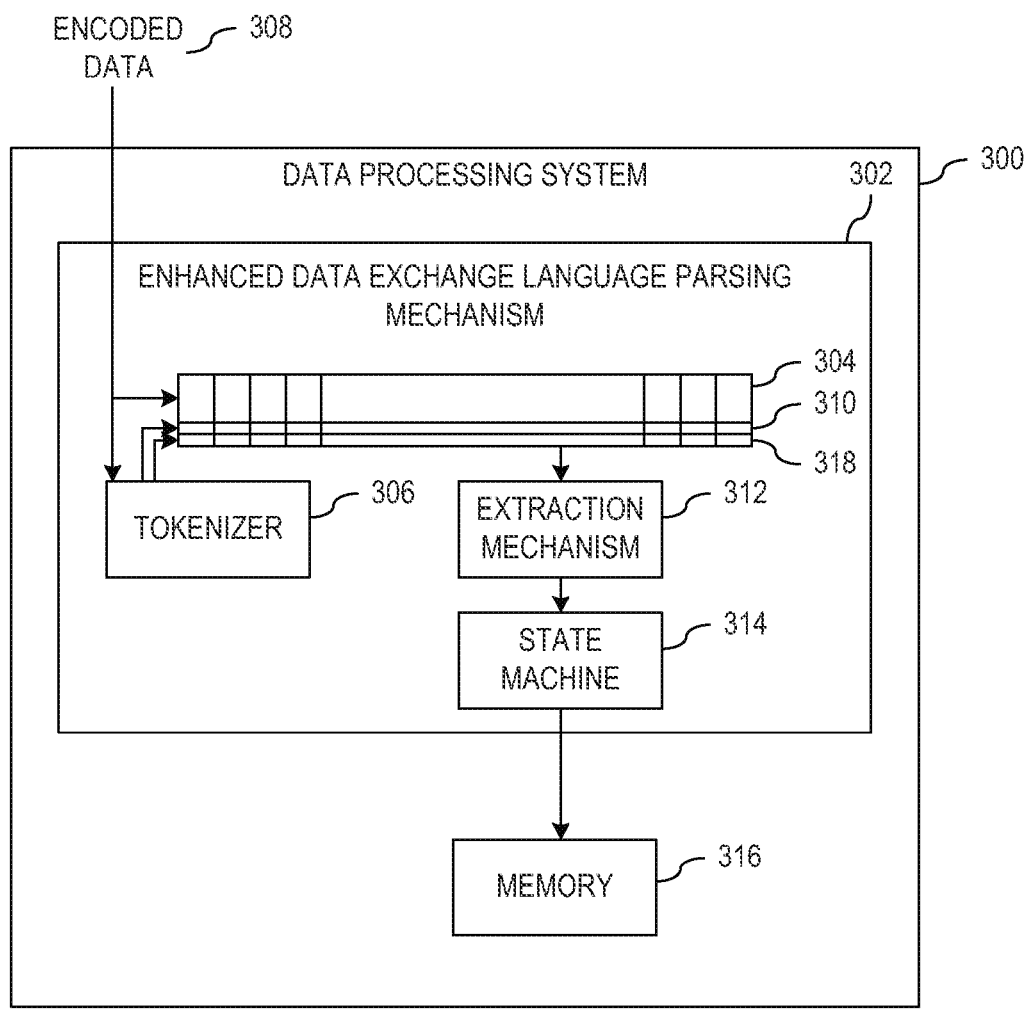
FIG. 3 depicts a functional block diagram of an enhanced data exchange language parsing mechanism to accelerate data exchange language parsing in accordance with an illustrative embodiment.

FIG. 3 depicts a functional block diagram of an enhanced data exchange language parsing mechanism to accelerate data exchange language parsing in accordance with an illustrative embodiment. Enhanced data exchange language parsing mechanism 302 may be comprised within data processing system 300, which may be a data processing system such as data processing system 200 of FIG. 2. Enhanced data exchange language parsing mechanism 302 comprises first in, first out (FIFO) memory 304 and tokenizer 306. When data processing system 300 receives encoded data 308 per cycle, enhanced data exchange language parsing mechanism 302 loads x characters of encoded data 308 into FIFO 304 based on a position of a write pointer associated with FIFO 304 and then increments the write pointer by x. If there is not enough space in FIFO 304 to accept all x characters, enhanced data exchange language parsing mechanism 302 stalls the input for all the x characters until a time where space is available in FIFO 304 to accept all x characters. As the data is loaded into FIFO 304, tokenizer 306 analyzes each character to identify control characters and non-control characters. Control characters are specific to the encoding language being utilized, which may be, for example, braces, commas, quotes, semicolons, or the like. Conversely, non-control characters are characters such as alphanumeric characters, whitespaces, or the like, but may also include some control characters depending on where the control character appears. For example, if a comma appears between a set of quotes, then the comma is a non-control character. Thus, the tokenization used in the illustrative embodiment is also specific to the language being utilized.

As tokenizer 306 analyzes the encoded data, if tokenizer 306 determines that the character is a control character, then tokenizer 306 associates a set of bits with that byte of data representing that control character in FIFO 304 indicating that that byte is a control character, tokenization bit 310, and has a length of one, length bits 318. If tokenizer 306 determines that the character is a non-control character, then tokenizer 306 associates a set of bits with that byte of data representing that non-control character in FIFO 304 indicating that that byte is a non-control character, tokenization bit 310. However, in contradistinction to indicating a length of one as tokenizer does with control characters, tokenizer 306 analyzes the subsequent n characters in encoded data 308 to find position of next control character in encoded data 308. Here n is a design parameter that can be selected during implementation and it indicates the maximum number of characters in a token that can be processed by the parsing engine. Once tokenizer 306 identifies a next control character, tokenizer 306 updates length bits 318 associated with the first of the instant string of non-control characters with the number of non-control characters in the instant string. If the tokenizer 306 does not find a control character in the next n characters, tokenizer 306 updates length bits 318 associated with the first of the instant string of non-control characters with n. Thus, tokenizer 306 maintains tokenization bit 310 and length bits 318 (a set for each byte in FIFO 304) to indicate if the corresponding byte in the FIFO represents a control character or a string of non-control characters and the length associated with the control character or string of non-control characters. Therefore, while each control character has a length of one, each non-control character string may have a length of 1 to n.

As soon as enhanced data exchange language parsing mechanism 302 loads at least one byte into FIFO 304 and tokenizer 306 associated a tokenization bit 310 and length bits 318 to that byte or string of bytes, extraction mechanism 312 extracts the first tokenization bit 310, based on a read pointer associated with FIFO 304. Based on the length identified by the length bits 318, extraction mechanism 312 extracts the associated byte(s) from FIFO 304, based on the read pointer, and sends the bytes to state machine 314, incrementing the read pointer thereafter. In an alternative embodiment, rather than utilizing length bits 318, extraction mechanism 312 may determine the length of the associated byte(s) from FIFO 304 that should be read at one time based on examining the next n consecutive number of tokenization bits 310. If extraction mechanism 312 determines that tokenization bit 310 indicates a control character, then extraction mechanism 312 only reads that control character from FIFO 304. However, if extraction mechanism 312 determines that tokenization bit 310 indicates a non-control character, then extraction mechanism 312 reads each of the n immediately following tokenization bits 310 to find the position of the next tokenization bit 310 indicating a control character. Extraction mechanism 312 then extracts the maximum number of consecutive non-control characters from the FIFO based on above identified position, incrementing the read pointer thereafter. This sequence of non-control characters is then fed directly to state machine 314 as a multiple character token.

State machine 314 is different from existing state machines, in that, state machine 314 can receive tokens of variable lengths. State machine 314 transitions states only when the tokenization bit 310 indicates a control character.

When the tokenization bit 310 indicates a control character, the state machine 314 reads the control character and changes state according to the processing flow. When the tokenization bit 310 indicates a non-control character, state machine 314 does not change state and can parse the characters associated with length bits 318 associated with the tokenization bit together. Thus, rather than processing one character every cycle to avoid the possibility of multiple state transitions in a single cycle, state machine 314 is able to process non-control characters of length 1 to n within fewer cycles, where 1 to n bytes are processed within each cycle as opposed to only one character per cycle. State machines parse encoded data and write the parsed output to memory 316, to produce an in-memory data structure of the data, for example, a document may be parsed to create a tree like data structure in memory with pointers between different elements. Further, while state machine 314 may write a sequence of non-control characters directly to memory 316, control characters may not be written to memory 316. Rather, the occurrence of control characters may determine the state transitions and subsequent processing for in-memory construction of the data structure.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 4:
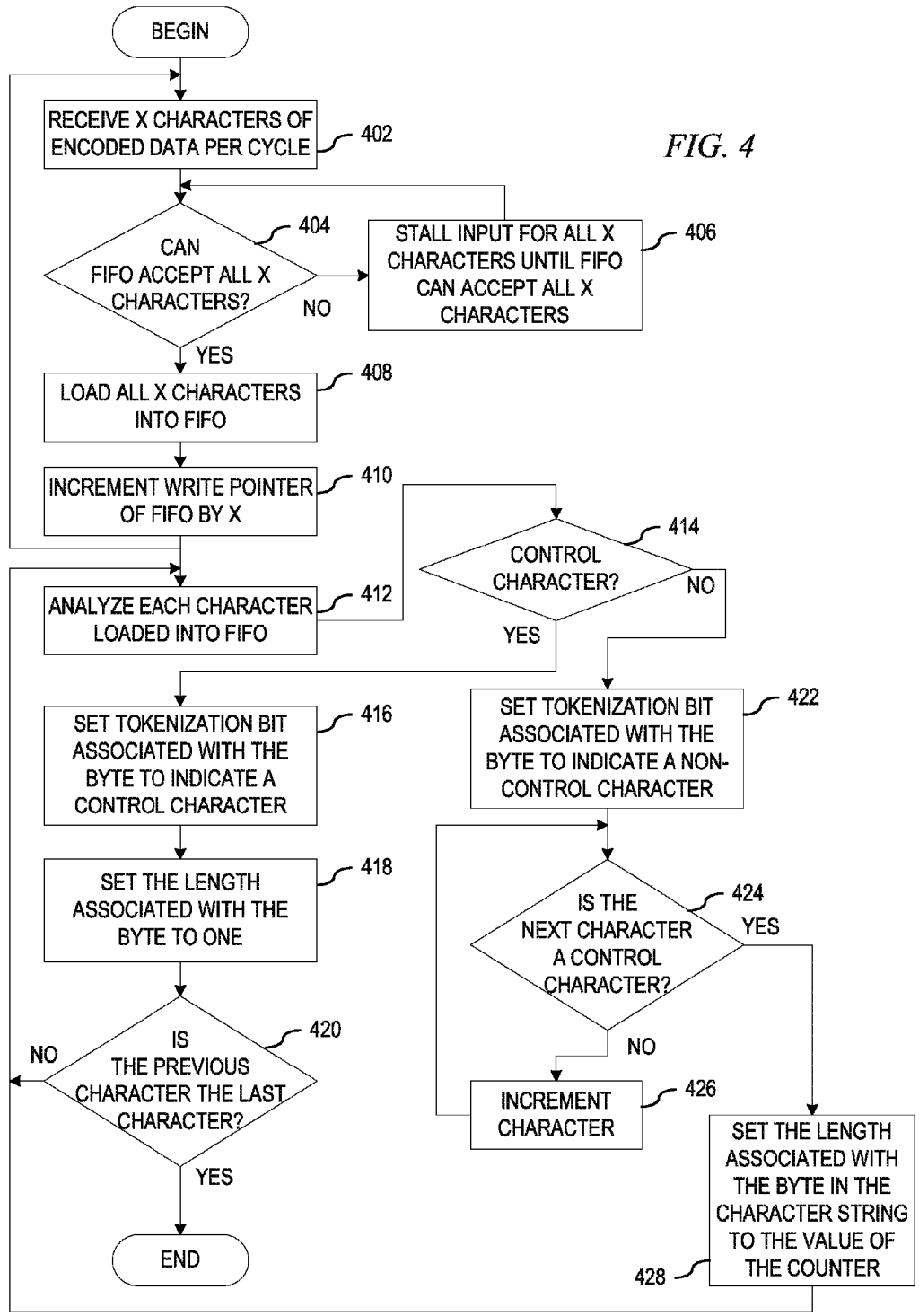
FIG. 4 depicts a flow diagram performed by an enhanced data exchange language parsing mechanism in analyzing an encoded language in accordance with an illustrative embodiment.

FIG. 4 depicts a flow diagram performed by an enhanced data exchange language parsing mechanism in analyzing an encoded language in accordance with an illustrative embodiment. As the operation begins, the enhanced data exchange language parsing mechanism, executed by a processor, receives x characters of encoded data per cycle (step 402). The enhanced data exchange language parsing mechanism then determines if a first in, first out (FIFO) memory can accept all the x characters (step 404). If at step 404 the FIFO cannot accept all the x characters, the enhanced data exchange language parsing mechanism stalls the input until there is an opening in the FIFO for all the x characters (step 406). If at step 404 the FIFO can accept all the x characters, the enhanced data exchange language parsing mechanism loads all x characters into the FIFO (step 408) and increments the write pointer of the FIFO by x (step 410).

The operation then splits at this point with the enhanced data exchange language parsing mechanism returning to step 402 to continue loading other characters of the encoded data and analyzing each character loaded into the FIFO (step 412). The enhanced data exchange language parsing mechanism identifies whether the character is a control character or a non-control character (step 414). If at step 414 the enhanced data exchange language parsing mechanism identifies a control character, the enhanced data exchange language parsing mechanism sets a tokenization bit associated with the byte to indicate a control character (step 416) and sets the length bits associated with the byte to one (step 418). The enhanced data exchange language parsing mechanism then determines whether the previously analyzed character is the last character in the encoded data (step 420). If at step 420 the previously analyzed character is not the last character, then the operation returns to step 412. If at step 420 the previously analyzed character is the last character, the operation terminates.

If at step 414 the enhanced data exchange language parsing mechanism identifies a non-control character, the enhanced data exchange language parsing mechanism sets a set of tokenization bit associated with the byte to indicate a non-control character (step 422). The enhanced data exchange language parsing mechanism then determines whether the next character in the encoded data is a control character (step 424). If at step 424 the next character is not a control character, the enhanced data exchange language parsing mechanism increments its length, which is initially set to one (step 426), with the operation returning to step 424 thereafter. If at step 424 the next character is a control character, the enhanced data exchange language parsing mechanism sets the length bits associated with the byte in the character string to the value of the length (step 428), with the operation returning to step 412 thereafter.

Figure 5:
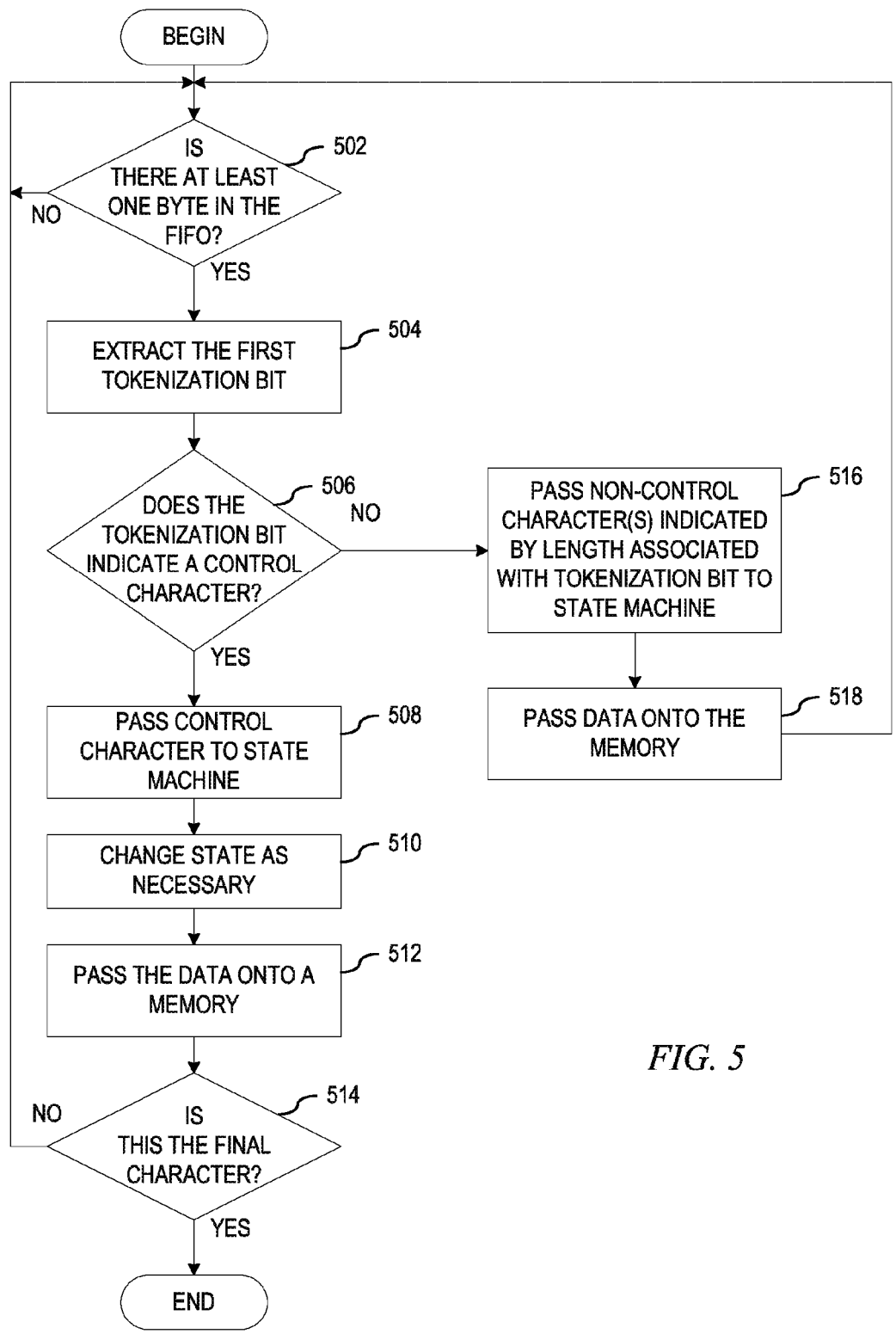
FIG. 5 depicts a flow diagram performed by an enhanced data exchange language parsing mechanism in processing data loaded into a first in, first out (FIFO) memory by an enhanced data exchange language parsing mechanism in accordance with an illustrative embodiment.

FIG. 5 depicts a flow diagram performed by an enhanced data exchange language parsing mechanism in processing data loaded into a first in, first out (FIFO) memory by an enhanced data exchange language parsing mechanism in accordance with an illustrative embodiment. As the operation begins, the enhanced data exchange language parsing mechanism, executed by a processor, determines whether there is at least one character (one byte) loaded into the FIFO (step 502). If at step 502 there is not at least one character in the FIFO, the operation returns to step 502. If at step 502 there is at least one character in the FIFO, the enhanced data exchange language parsing mechanism extracts the first tokenization bit, based on a read pointer associated with the FIFO (step 504). The enhanced data exchange language parsing mechanism then determines whether the tokenization bit indicates a control character (step 506).

If at step 506 the enhanced data exchange language parsing mechanism determines that the tokenization bit indicates a control character, then the enhanced data exchange language parsing mechanism passes the control character to a state machine (step 508). The state machine changes state based on the control character (step 510). The state machine then passes data onto a memory associated with the data processing system (step 512). The data that state machine passed to the memory depends on the characters, the structure of the encoded data, the processing objective, or the like. The enhanced data exchange language parsing mechanism then determines whether this is the final character loaded into the FIFO (step 514). If at step 514 the enhanced data exchange language parsing mechanism determines that this is not the final character in the FIFO, then the operation returns to step 502. If at step 514 the enhanced data exchange language parsing mechanism determines that this is the final character in the FIFO, then the operation terminates.

If at step 506 the enhanced data exchange language parsing mechanism determines that the tokenization bit indicates a non-control character, then the enhanced data exchange language parsing mechanism passes the non-control character(s) indicated by the length associated with the tokenization bit to the state machine (step 516). The state machine then passes data onto the memory associated with the data processing system (step 518), with the operation retiming to step 502 thereafter. The data that state machine passed to the memory depends on the characters, the structure of the encoded data, the processing objective, or the like.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for accelerating data exchange language parsing by tokenizing language syntax characters within the input character stream. The tokenization on control characters presents variable length tokens for subsequent processing. A single character length token is presented for processing whenever a language syntax character is encountered with a single to multiple character length token being presented when the character sequence does not contain any of the language syntax characters. While state machine transitions are similar to the state transitions in the conventional architectures with at most one transition every cycle, variable length token processing improves average processing bandwidth with no state machine explosion.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for accelerating data exchange language parsing, the method comprising:
    loading, by a processor, an input data stream into a first in, first out (FIFO) memory;
    extracting, by the processor, a tokenization bit corresponding to a next byte to be read from the FIFO;
    determining, by the processor, whether the tokenization bit corresponding to the next byte to be read from the FIFO indicates a control character or a non-control character located in an associated FIFO memory location in the FIFO;
    responsive to the tokenization bit indicating the control character located in the associated FIFO memory location in the FIFO, processing, by the processor, the control character, wherein the control character causes a state change in a state machine and wherein processing the control character increments the FIFO read pointer by one space; and
    responsive to the tokenization bit indicating the non-control character located in the associated FIFO memory location in the FIFO, identifying, by the processor, a length associated with the tokenized bit and processing, by the processor, a set of non-control characters based on the length associated with the tokenized bit, wherein processing the set of control characters increments the FIFO read pointer based on the length associated with the tokenized bit and wherein the set of non-control characters do not cause a state change in the state machine.

2. The method of claim 1, wherein the set of non-control characters are processed at an average rate of multiple non-control characters per cycle.

3. The method of claim 1, wherein processing the set of non-control characters is optionally performed by:
    processing, by the processor, the set of non-control characters based on an identification of a consecutive set of tokenized bits indicating non-control characters, wherein processing the set of control characters increments the read pointer based on a length of the consecutive set of tokenized bits indicating non-control characters, and wherein the set of non-control characters do not cause a state change in the state machine.

4. The method of claim 3, wherein the set of non-control characters are processed at a rate of n non-control characters per cycle, wherein n is greater than 1.

5. The method of claim 1, wherein the state machine is specific to a language used to encode data from which the control character and the non-control character originate.

6. The method of claim 1, wherein the tokenization bit is associated with the control character or the non-control character by the method comprising:
    loading, by the processor, a set of characters into the FIFO based on a position of a write pointer associated with the FIFO;
    incrementing, by the processor, the write pointer based on the set of characters loaded into the FIFO;
    analyzing, by the processor, each character from encoded data received by the data processing system;
    for each character, determining, by the processor, whether the character is a control character or a non-control character;
    responsive to the character being the control character, setting, by the processor, the tokenization bit to indicate the control character; and
    setting, by the processor, length bits of the control character to one.

7. The method of claim 6, wherein multiple characters are loaded into the FIFO during each cycle and wherein the write pointer is incremented based on the number of characters written during each cycle.

8. The method of claim 6, further comprising:
    responsive to the character being the non-control character, setting, by the processor, the tokenization bit to indicate the non-control character;
    determining, by the processor, whether the next character is a control character or a non-control character;
    responsive to the next character being a non-control character thereby forming a string of non-control characters, incrementing, by the processor, a length; and
    responsive to the next character being a control character, setting, by the processor, length bits associated with a first non-control character in the string of the non-control characters to a value of the length.

9. The method of claim 8, wherein the length is set to an initial value of 1.

10. The method of claim 8, wherein the length is reset to a value of 1 upon setting the length bits associated with the first non-control character in the string of the non-control characters to the value of the length.

11. A computer program product comprising a computer readable storage medium having a computer readable program stored therein, wherein the computer readable program, when executed on a computing device, causes the computing device to:
    load an input data stream into a first in, first out (FIFO) memory;
    extract a tokenization bit corresponding to a next byte to be read from the FIFO;
    determine whether the tokenization bit indicates a control character or a non-control character located in an associated FIFO memory location in the FIFO;
    responsive to the tokenization hit indicating the control character located in the associated FIFO memory location in the FIFO, process the control character, wherein the control character causes a state change in a state machine and wherein processing the control character increments a read pointer by one space; and
    responsive to the tokenization bit indicating the non-control character located in the associated FIFO memory location in the FIFO, identify a length associated with the tokenized bit and process a set of non-control characters based on the length associated with the tokenized bit, wherein processing the set of control characters increments a read pointer based on the length associated with the tokenized bit and wherein the set of non-control characters do not cause a state change in the state machine.

12. The computer program product of claim 11, wherein the set of non-control characters are processed at an average rate of multiple non-control characters per cycle.

13. The computer program product of claim 11, wherein the computer readable program to identify a length associated with the tokenized bit and process the set of non-control characters causes the computing device to:
process the set of non-control characters based on an identification of a consecutive set of tokenized bits indicating non-control characters, wherein processing the set of control characters increments the read pointer based on a length of the consecutive set of tokenized bits indicating non-control characters, wherein the set of non-control characters do not cause a state change in the state machine, wherein the set of non-control characters are processed at a rate of n non-control characters per cycle, wherein n is greater than 1.

14. The computer program product of claim 11, wherein the computer readable program associates the tokenization bit with the control character or the non-control character by causing the computing device to:
load a set of characters into the FIFO based on a position of a write pointer associated with the FIFO;
increment the write pointer based on the set of characters loaded into the FIFO;
analyze each character from encoded data received by the data processing system;
for each character, determine whether the character is a control character or a non-control character;
responsive to the character being the control character, set the tokenization bit to indicate the control character; and
set length bits of the control character to one.

15. The computer program product of claim 14, wherein multiple characters are loaded into the FIFO during each cycle and wherein the write pointer is incremented based on the number of characters written during each cycle.

16. The computer program product of claim 14, wherein the computer readable program further causes the computing device to:
responsive to the character being the non-control character, set the tokenization bit to indicate the non-control character;
determine whether the next character is a control character or a non-control character;
responsive to the next character being a non-control character thereby forming a string of non-control characters, increment a length; and
responsive to the next character being a control character, set length bits associated with a first non-control character in the string of the non-control characters to a value of the length, wherein the length is set to an initial value of 1 and wherein the length is reset to a value of 1 upon setting the length bits associated with the first non-control character in the string of the non-control characters to the value of the length.

17. An apparatus, comprising:
a processor; and
a memory coupled to the processor, wherein the memory comprises instructions which, when executed by the processor, cause the processor to:
load an input data stream into a first in, first out (FIFO) memory;
extract a tokenization bit corresponding to a next byte to be read from the FIFO;
determine whether the tokenization bit indicates a control character or a non-control character located in an associated FIFO memory location in the FIFO;
responsive to the tokenization bit indicating the control character located in the associated FIFO memory location in the FIFO, process the control character, wherein the control character causes a state change in a state machine and wherein processing the control character increments a read pointer by one space; and
responsive to the tokenization bit indicating the non-control character located in the associated FIFO memory location in the FIFO, identify a length associated with the tokenized bit and process a set of non-control characters based on the length associated with the tokenized bit, wherein processing the set of control characters increments a read pointer based on the length associated with the tokenized bit and wherein the set of non-control characters do not cause a state change in the state machine.

18. The apparatus of claim 17, wherein the set of non-control characters are processed at an average rate of multiple non-control characters per cycle.

19. The apparatus of claim 17, wherein the instructions to identity a length associated with the tokenized bit and process the set of non-control characters optionally causes the processor to:
process the set of non-control characters based on an identification of a consecutive set of tokenized bits indicating non-control characters, wherein processing the set of control characters increments the read pointer based on a length of the consecutive set of tokenized bits indicating non-control characters, wherein the set of non-control characters do not cause a state change in the state machine, wherein the set of non-control characters are processed at a rate of n non-control characters per cycle, wherein n is greater than 1.

20. The apparatus of claim 17, wherein the instructions associate the tokenization bit with the control character or the non-control character by causing the processor to:
load a set of characters into the FIFO based on a position of a write pointer associated with the FIFO;
increment the write pointer based on the set of characters loaded into the FIFO;
analyze each character from encoded data received by the data processing system;
for each character, determine whether the character is a control character or a non-control character;
responsive to the character being the control character, set the tokenization bit to indicate the control character; and
set length bits of the control character to one.

21. The apparatus of claim 20, wherein multiple characters are loaded into the FIFO during each cycle and wherein the write pointer is incremented based on the number of characters written during each cycle.

22. The apparatus of claim 20, wherein the instructions further cause the processor to:
responsive to the character being the non-control character, set the tokenization bit to indicate the non-control character;
determine whether the next character is a control character or a non-control character;
responsive to the next character being a non-control character thereby forming a string of non-control characters, increment a length; and
responsive to the next character being a control character, set length bits associated with a first non-control character in the string of the non-control characters to a value of the length, wherein the length is set to an initial value of 1 and wherein the length is reset to a value of 1 upon setting the length bits associated with the first non-control character in the string of the non-control characters to the value of the length.

* * * * *